United States Patent Office 3,199,996
Patented Aug. 10, 1965

3,199,996
POROUS MATERIAL
Florent H. Bailly, Arcadia, Calif., assignor to Variperm Company, Los Angeles, Calif., a corporation of California
No Drawing. Filed Dec. 14, 1962, Ser. No. 244,555
2 Claims. (Cl. 106—86)

This invention relates to a material which has a porosity in the range of 40% to 80%, and to methods for making the material.

In various types of building materials and filter elements, there is often need for a material or matrix of high porosity and of various permeabilities. For example, in certain types of building material where accoustical or thermal insulation is important, it is desired that porosity be as high as practical, with a minimum amount of permeability to reduce heat flow and sound transmission. On the other hand, in various types of filtering applications, it is often desirable to have the maximum possible permeability and porosity, but with minimum pore size for best filtering efficiency.

This invention provides an inexpensive material which has relatively high porosity. Moreover, the porosity, as well as the permeability of the material, can easily be varied over a wide range.

It has been conventional practice to pack particles or aggregate and bond them together with cement to form building materials and even filter panels. The packing arrangement of particles of various sizes and shapes controls porosity as well as permeability. The most stable packing of uniform spheres is rhombohedral, and produces porosity of 25.95%. To increase or decrease this value, the shape relationship of one particle to another has to be considered to maintain maximum stability in the packing arrangement of the particles. This, in turn, requires adjustment in values of surface area of the controlled shapes to obtain permeability control. For example, to get porosity in excess of 25.95%, it is necessary either to use particles of irregular and specially selected shapes, or somehow provide an unstable packing arrangement which provides increased porosity. The latter is difficult, if not impossible, to achieve on a commercial basis, because in normal mixing and tamping procedures, the most stable packing distribution is naturally assumed by the aggregate particles.

With this invention, the particles, whatever their size or shape, are mixed with a cementitious material, say Portland cement, so the cement is disposed in the void spaces between aggregate particles. All, or at least a substantial part of the aggregate is soluble in a solvent which does not affect the set cement, or which can be vaporized or melted at a temperature which has no adverse effect on the set cement. In short, the aggregate particles are removable from the set cement by solution, heating, or both. The aggregate and cement are mixed with just sufficient water to make a suitable slurry, which is then allowed to set to a solid matrix. The aggregate is thereafter removed by heating or dissolving from the cemented mass after the suitable period has been allowed for setting and hardening. The remaining lattice work is a cast of the interstices of the aggregate pack, and the percentage of void space is equal to the volume of the aggregate previously in the mass. The surfaces of the void space are the same as the surfaces presented by the aggregate before being dissolved. Hence, the permeability is not reduced below that which would prevail for the most stable packing to produce 25.95% porosity. Instead, permeability is increased because of increased pore space, because the aggregate occupies anywhere from 40% to 80% of the volume of the mass before being dissolved.

Therefore, in terms of product, this invention contemplates a porous matrix or mass made of Portland cement having a porosity in the range of 40% to 80%.

In the preferred method, water is mixed with one volume of cementitious material, say pozzolanic Portland cement, and one to four volumes of aggregate. At least half of the aggregate, by volume, is water soluble. The materials are thoroughly mixed, and permitted to set to form a rigid matrix, or mass. Thereafter, the soluble aggregate is leached from the firmly set matrix to provide a porous cementitious volume. The aggregate can be any material which is soluble in water or some other suitable solvent.

Preferably, the aggregate consists of particles principally of two screen sizes, which are approximately three mesh sizes apart. Moreover, the larger particles make up the bulk, by volume, of the aggregate, so that there is approximately one large particle for each small particle. In addition, there are three volumes of total aggregate for each volume of cement. By selecting aggregate in which the particle sizes vary by about two or three screen sizes, the ratio of the effective particle size diameter of the large particle to the small is approximately 1.414, i.e., the square root of two. The ideal condition is approached by choosing an aggregate of one mesh size and mixing 74% by volume of the one size with 26% by volume of a smaller mesh size, the larger size being about 1.4 to about 1.7 times the smaller. This particle size distribution pairs off in any unit volume one large particle to one small one, thereby giving a structure, whether one or more layers thick, which is ellipsoidal in nature. This blended aggregate, when packed and bonded in desired filter shape, presents on filter surfaces openings which induce unstable flow of fluids through the material. Depending upon velocities induced by pressure, turbulence generated at the openings tends to prevent solids from resting on the surface of the filter.

Preferably, the soluble aggregate is leached with moist steam or hot water to reduce leaching time.

These and other aspects of the invention will be more fully understood from the following detailed description and examples given below.

*Example No. 1*

Rock salt aggregate is graded into two groups of particle sizes. In one group, the particles pass through 5-mesh screen, but rest on 6-mesh screen. (Throughout the description, the terms "screen" and "screen size" refer to the standard Tyler screen system.) In the other group, the particles pass through 8-mesh screen and rest on 9-mesh screen. By volume, 74% of the larger particle size aggregate is mixed with 26% by volume of the smaller particle size aggregate. The blended aggregate mix is then mixed with pozzolanic Portland cement, the final mixture including 74.05% aggregate and 25.95% cement. Sufficient water is added to this mixture to form a cement slurry. If desired, the water can be saturated or partially saturated with dissolved rock salt to reduce solution of the aggregate during the mixing and subsequent setting process, or the aggregate particles are coated with a thin film of oil, which is subsequently washed off during the leaching operation. The aggregate, cement and water are thoroughly mixed, dumped, vibrated, or tamped. In this way, the particles assume the most stable packing arrangement, which produces a void percentage of approximately 25.95%. This volume is substantially filled with cement.

The mix is allowed to set for 24 hours, or for a shorter time in an autoclave at about 270° F. The product is a rigid matrix or mass which is then set in a solvent atmosphere. When a water soluble aggregate such as rock salt is used, the atmosphere is moist steam or hot water. The solvent atmosphere can be circulated around the mass to increase solution, or even forced through it as the aggregate dissolves and the porosity and permeability of the mass increases. The dissolving process continues until all of the solute is dissolved out of the mix, or until the amount is dissolved out to get the desired porosity. If all of the soluble aggregate is dissolved, the result is a 74% porosity lattice work of pozzolanic Portland cement.

If desired, some of the soluble aggregate can be replaced by insoluble aggregate to increase the final strength of the product.

*Example No 2*

In this example, 74.05% rock salt by volume is mixed with 25.95% pozzolanic Portland cement. The aggregate is made up of particles in two sizes. 74% of the aggregate passes through No. 2 screen and rests on No. 3 screen. 26% of the aggregate passes through the No. 5 screen and rests on No. 6 screen. The aggregate and cement are mixed with water and set, as described in Example 1 above. The soluble aggregate is then dissolved to produce a lattice work with 74% porosity. Although the porosity of this product is substantially the same as the product resulting in Example No. 1, the permeability of the product in this example is greater than that in Example 1, because larger aggregate particles were dissolved from the matrix. Thus, by using aggregate of different particle sizes, permeability can be varied over a wide range, even though porosity remains substantially constant and high. This makes a product highly adaptable for various requirements of building materials and filter panels.

In addition to the water soluble salts, other types of aggregate can be used. For example, sulfur, lead, or wax, formed in particles in the range given in the preceding examples may be used in place of water soluble salt. If sulfur is used, it is removed by heating above its melting point of 120° C., and draining it from the product after the cement has set. Lead can be removed by heating, or low melting point alloys by heating to their melting points and draining from the products after the products after the cement is set. Wax, of course, can be selected from a wide range of melting point, and can be either melted and drained, or dissolved, or both, from the product after the cement has set. Particles of coke can also be used, and be removed by combustion.

I claim:
1. The method of making a porous matrix comprising forming a slurry with water, an oil-coated rock salt aggregate, and a cementitious material, there being one to four volumes of aggregate for each volume of cementitious material, permitting the slurry to set to a solid mass, and thereafter leaching out soluble said aggregate with a material selected from the group consisting of moist steam and hot water to form the porous matrix.

2. The method of making a porous matrix comprising forming a slurry with water, an oil-coated, water soluble aggregate, and a pozzolanic cementitious material, there being one to four volumes of aggregate for each volume of cementitious material, the aggregate being substantially totally of two particle sizes which differ from each other by a ratio of about 1.4 to about 1.7 of the larger to the smaller, permitting the slurry to set to a solid mass, and thereafter leaching out said aggregate with a material selected from the group consisting of moist steam and hot water.

References Cited by the Examiner
UNITED STATES PATENTS

| | | | |
|---|---|---|---|
| 1,344,324 | 6/20 | Walter | 106—86 |
| 1,623,989 | 4/27 | Wikkula | 106—86 |
| 1,896,190 | 2/33 | Smith et al. | 106—86 |
| 2,793,957 | 5/57 | Mangold et al. | 106—86 |

TOBIAS E. LEVOW, *Primary Examiner.*